Oct. 2, 1928.
G. A. FULLIPS
1,686,129
BOTTLE HANDLING MACHINE
Filed Dec. 22, 1925     7 Sheets-Sheet 1
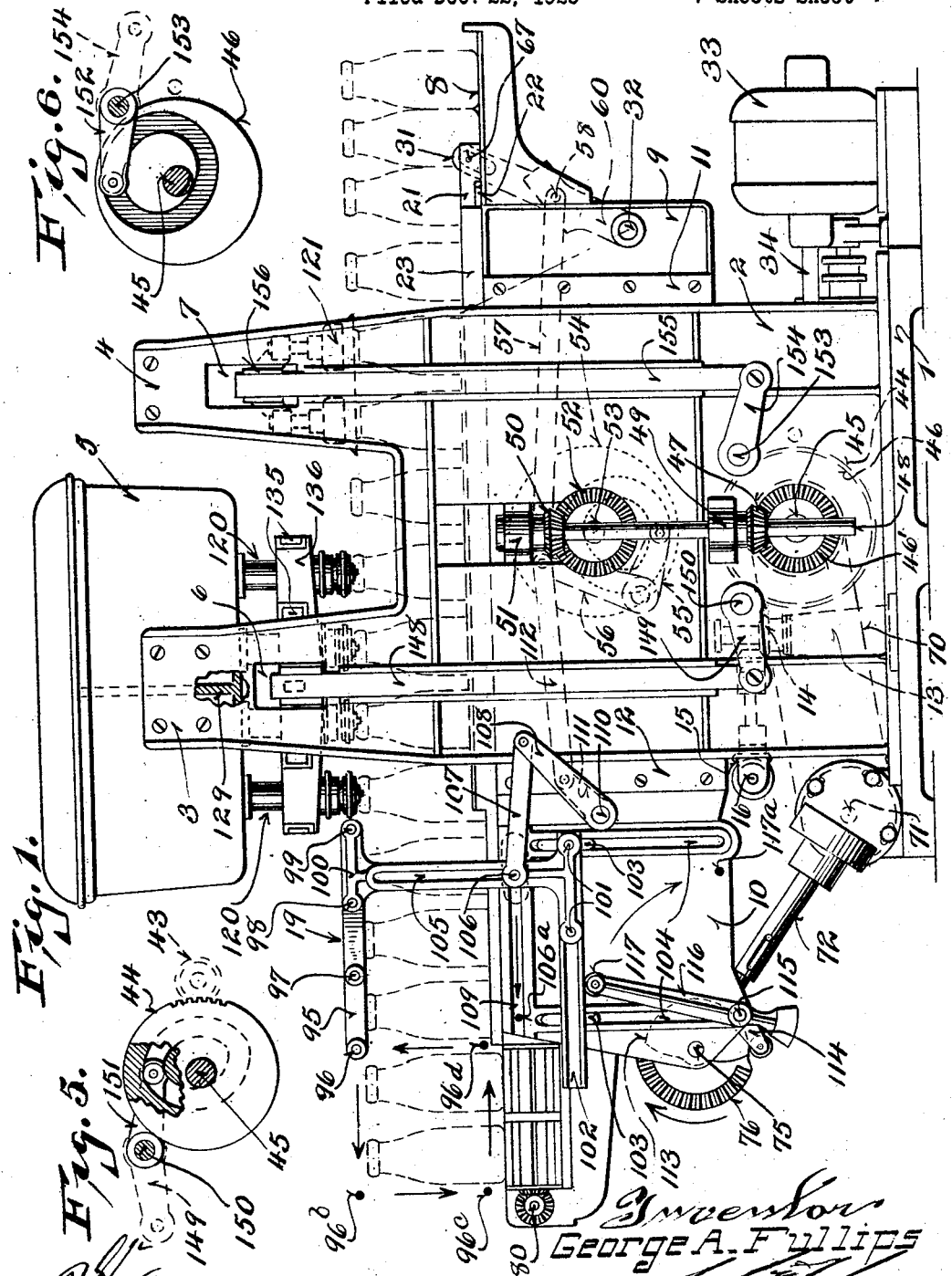

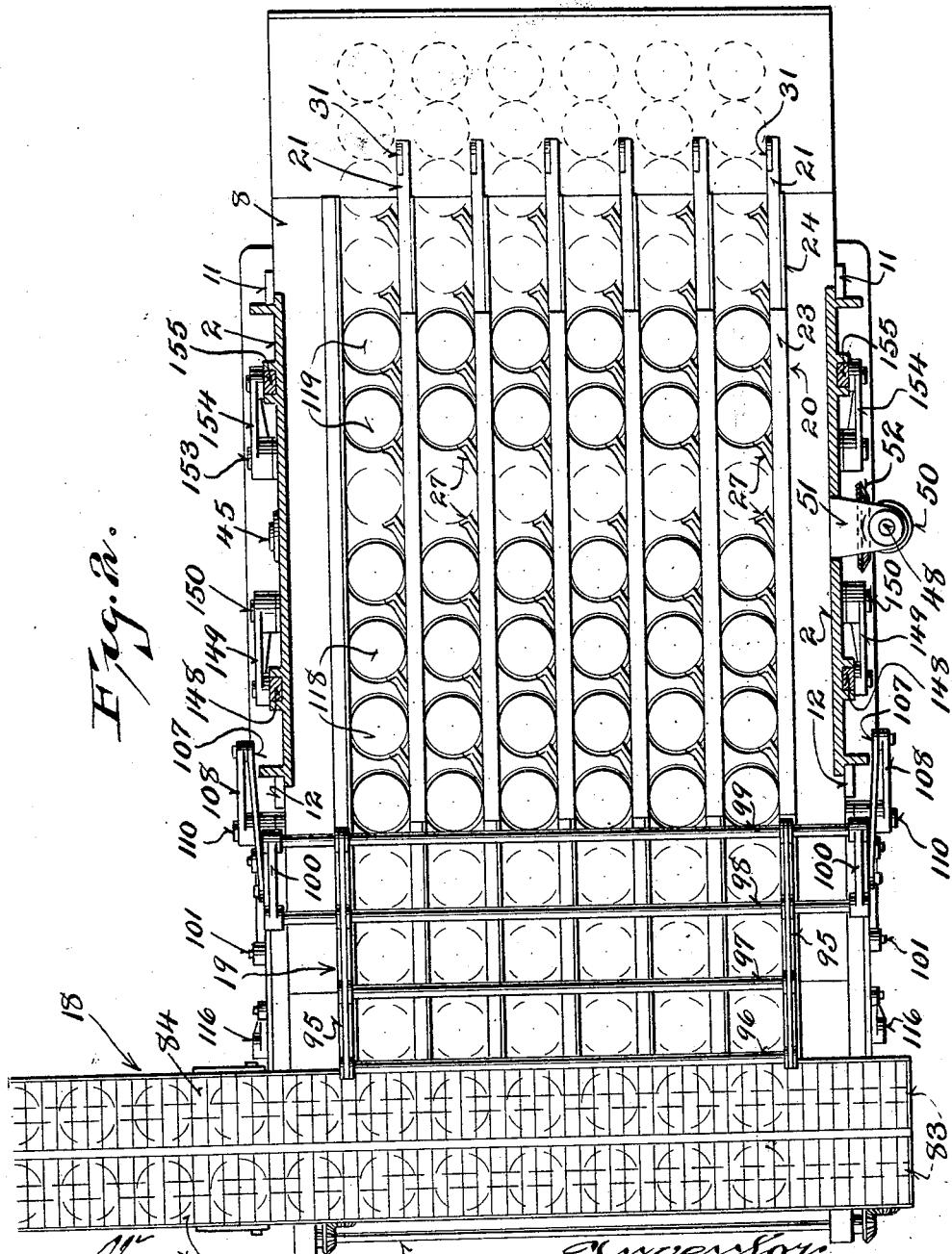

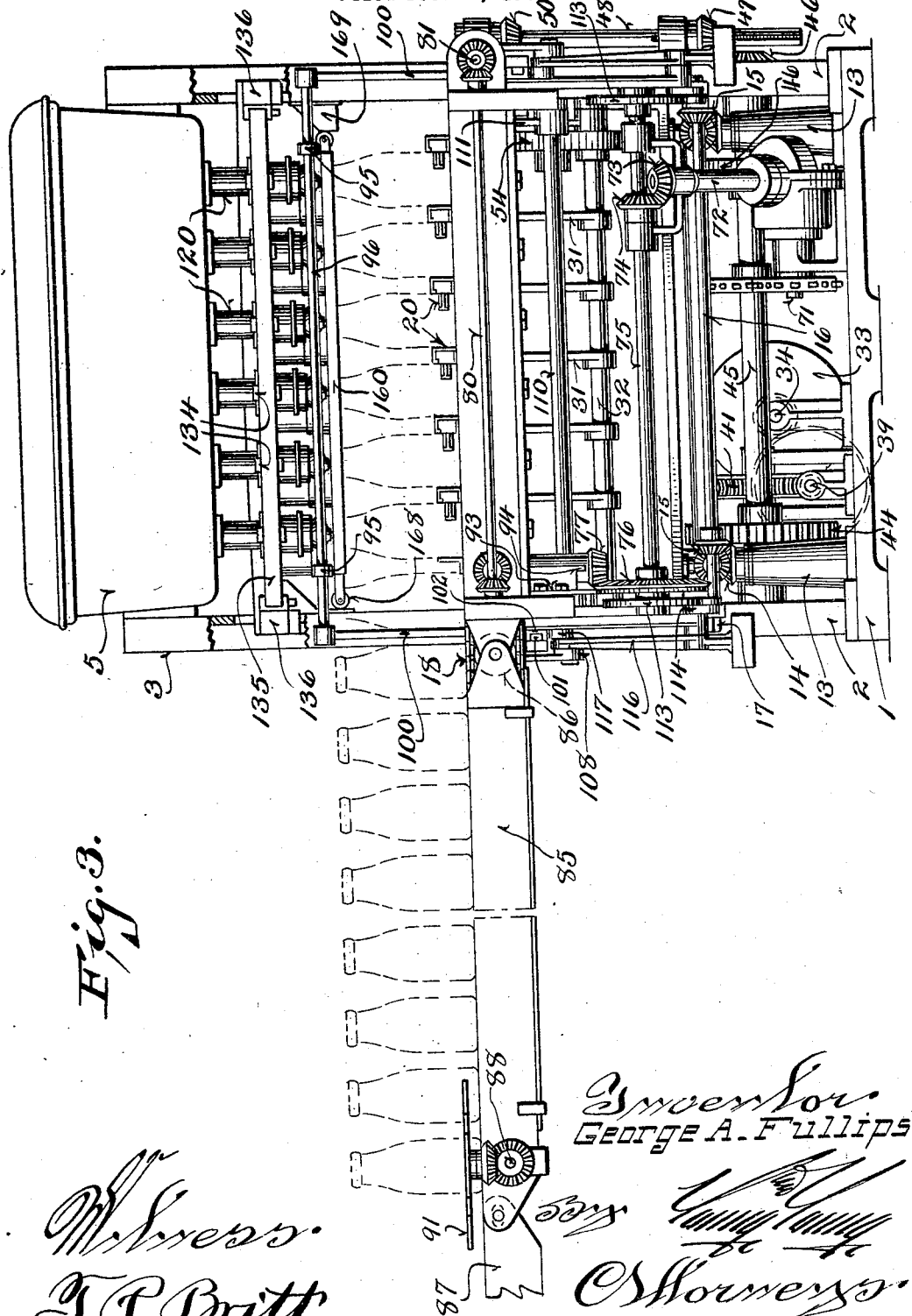

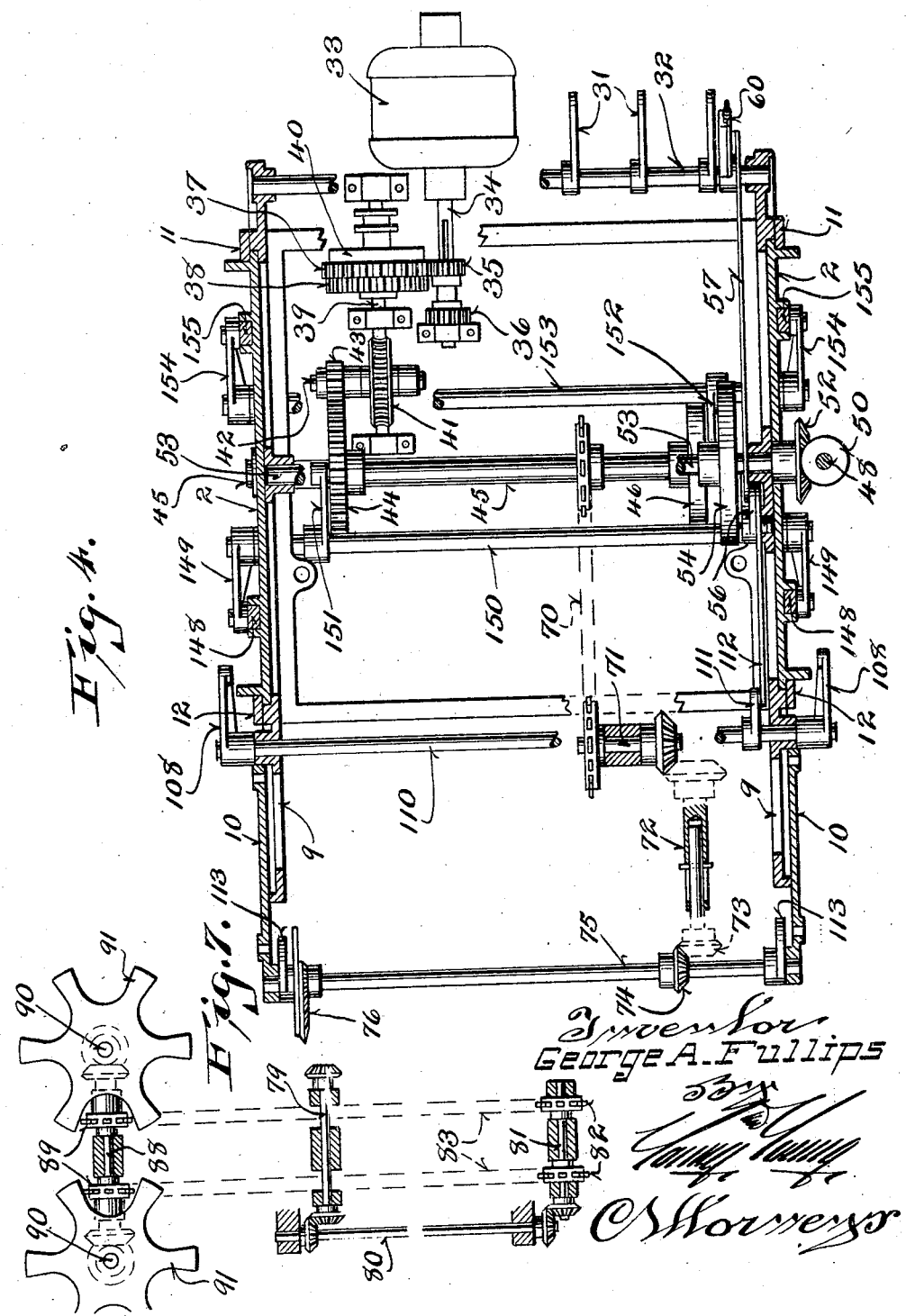

Oct. 2, 1928.  
G. A. FULLIPS  
1,686,129  
BOTTLE HANDLING MACHINE  
Filed Dec. 22, 1925  
7 Sheets-Sheet 5
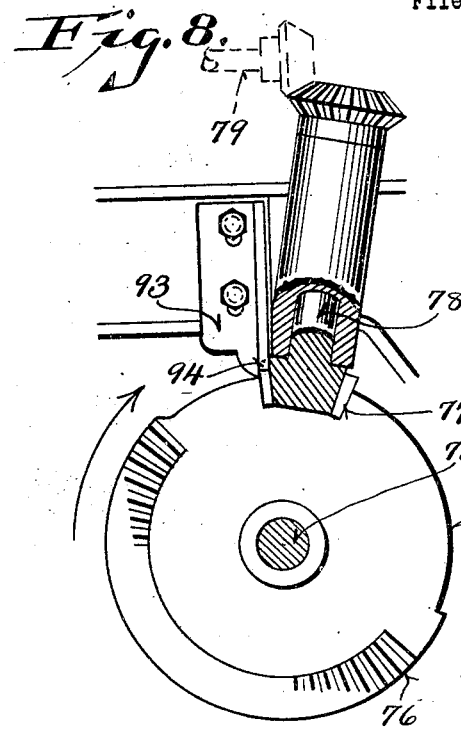
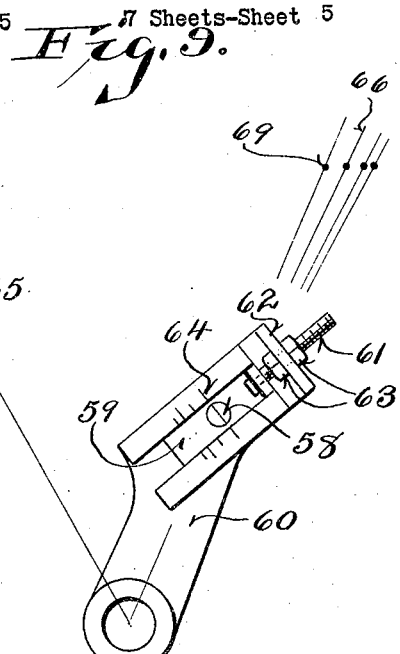
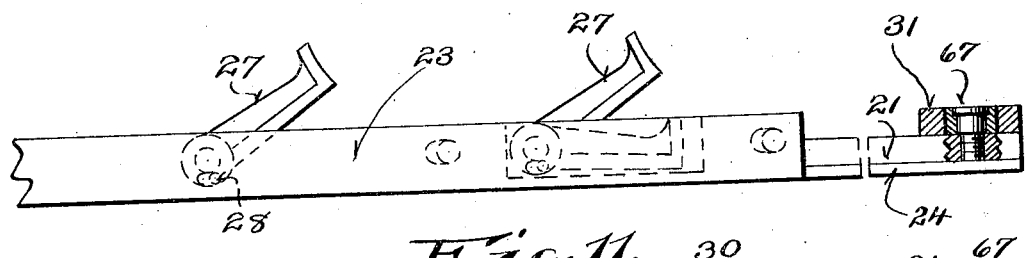
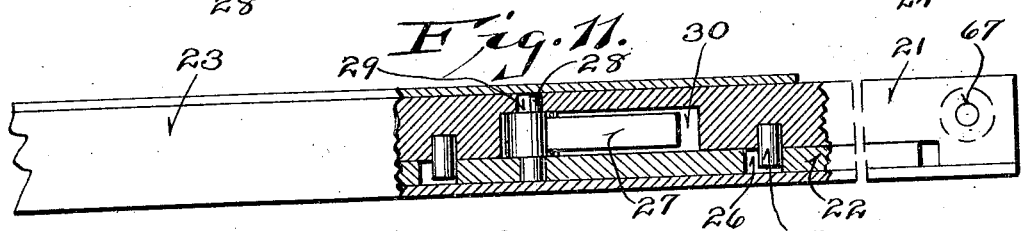

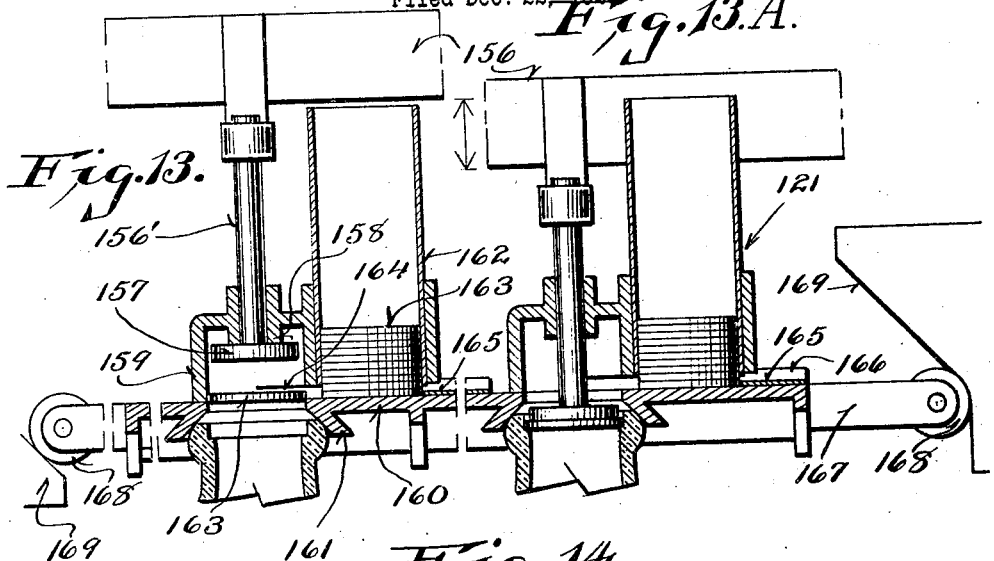
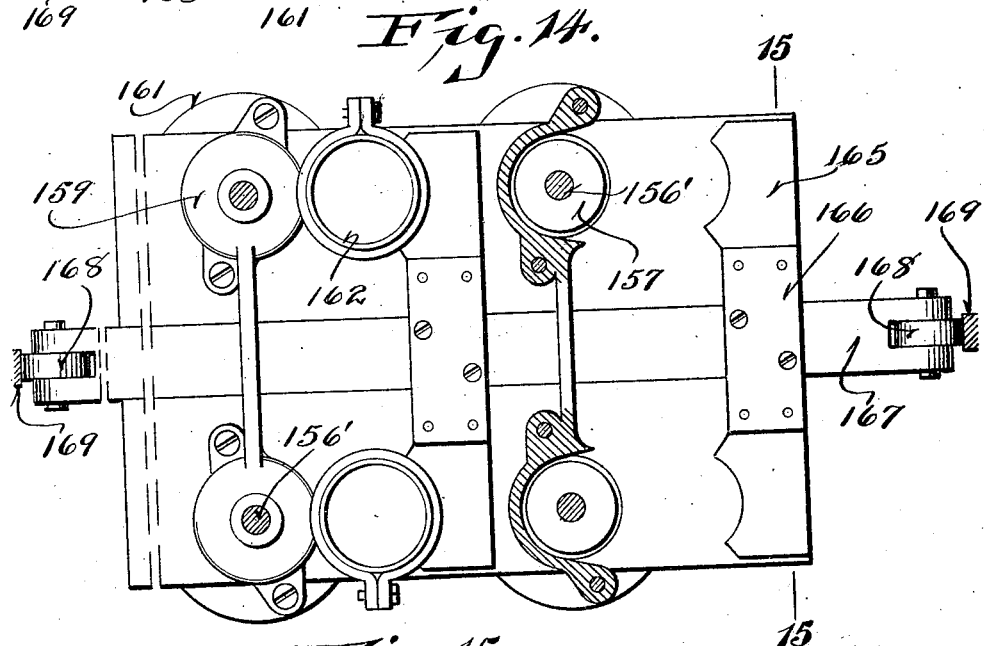
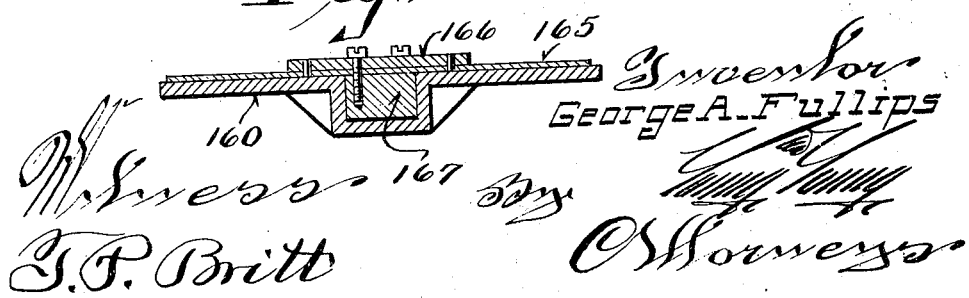

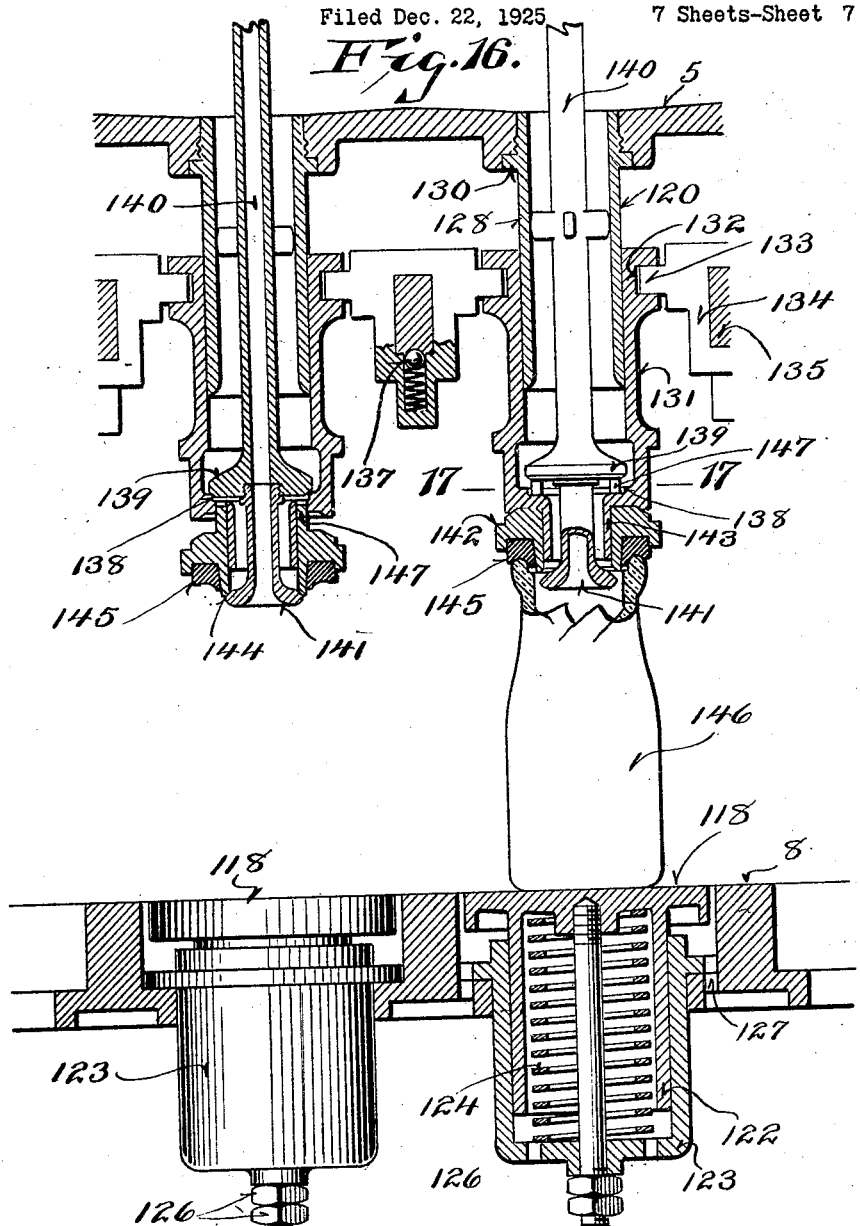

Patented Oct. 2, 1928.

1,686,129

UNITED STATES PATENT OFFICE.

GEORGE A. FULLIPS, OF MILWAUKEE, WISCONSIN.

BOTTLE-HANDLING MACHINE.

Application filed December 22, 1925. Serial No. 76,994.

This invention relates to a bottle handling machine, and is particularly directed to a bottle filling and capping machine.

Although the invention is applicable to a large number of different uses, it is particularly applicable to the handling, filling and capping of milk bottles and will be so described throughout this case to avoid needless repetition, it being understood that no limitation is to be imported into the case from this simplified form of description.

Objects of this invention are to provide a bottle filling machine in which the bottles are furnished in a uniform manner with a step by step motion without any sudden jerks and without tipping the bottle or spilling any of the contents thereof.

Further objects are to provide a bottle filling machine which operates upon a plurality of bottles at the same time, which has a very large output while each bottle is moved at a reasonable rate without requiring excessive speed for the individual bottles, but in which a large number of bottles are advanced in a plurality of rows.

Further objects are to provide a bottle filling machine in which a main conveyor is provided for advancing simultaneously a plurality of rows of bottles, in which means are provided for compensating for different sizes of bottles, that is to say, bottles having different heights and diameters, and in which individual means are employed for engaging each bottle, and in which such mechanism or means is moved out of the way on the back stroke of the conveyor, and to provide a machine in which the correct centering of the bottles under the filling and capping mechanism is assured.

Further objects are to provide a bottle filling machine in which a supply conveyor feeds a plurality of rows of bottles into the main portion of the machine and correctly spaces the bottles in each row and places such bottles in a properly related position for free access to other portions of the machine.

Further objects are to provide a transfer conveyor which takes the bottles from the supply conveyor and places them correctly with reference to the main conveyor, and in which the transfer conveyor is so constructed that it handles any size of bottles.

Further objects are to provide novel means for harmonizing or relating the action of the several conveyors, so that the transfer conveyor moves over the tops of the bottles and downwardly into position, and thus permits the supply conveyor and the main conveyor to operate upon the bottles without interference with the transfer conveyor.

An embodiment of the invention is shown in the accompanying drawings, in which:—

Figure 1 is a side elevation of the machine with parts broken away.

Figure 2 is a plan view looking down upon the main table of the machine with the superimposed apparatus removed, the side frames being shown in section.

Figure 3 is a rear view of the machine.

Figure 4 is a plan view of the driving mechanism with the major portion of the side frames and associated parts in section.

Figure 5 is a detail of the filler operating cam.

Figure 6 is a detail of the capper operating cam.

Figure 7 is a fragmentary view showing the manner in which the supply conveyor is driven together with its associated parts.

Figure 8 is a view showing a portion of the drive for the supply conveyor.

Figure 9 is a detail of the adjustable lever or rock arm for the main conveyor.

Figure 10 is a fragmentary view of one of the reciprocatory rods of the main conveyor.

Figure 11 is a side elevation partly in section of the structure shown in Figure 10.

Figure 12 is a sectional view through one of the bars or slides of the main conveyor.

Figure 13 is a fragmentary view of a portion of the capping mechanism showing it at the instant it is contacting with the bottle.

Figure 13$^A$ is a view showing the capping mechanism as it places the cap in position in the mouth of the bottle.

Figure 14 is a plan view of the structure shown in Figure 13 with, however, parts broken away and in section to more clearly show the construction.

Figure 15 is a sectional view on the line 15—15 of Figure 14.

Figure 16 is a view in section of the bottle filling device, and a portion of the table.

Figure 17 is a sectional view on the line 17—17 of Figure 16.

Referring in detail to the drawings, it will be seen, for instance, from Figure 1, that the machine comprises a bed plate 1 from which a pair of side frame members 2 extend. These side frames are positioned on opposite sides of the machine, as most clearly brought out in Figures 1 and 4, and form the main stationary portions of the machine.

The side frames 2 are provided with upwardly extending projections 3 and 4. The projection 3 carries the milk tank or supply vat 5 and is cut away, as indicated at 6, to provide a place for connecting the operating mechanism with the bottle filling means. Similarly, the upright 4 is cut away, as indicated at 7, to provide a place through which the operating mechanism may be connected to the capping device.

Between these side frame bars a table 8 is positioned and is carried by the supporting member 9. (See Figure 4.) This supporting member 9 is provided with guiding strips 11 and 12 which engage the outer surfaces or edges of the side frames and thus permit elevating or lowering of the table without any rocking or binding thereof. The tube is further provided with rear plates 10.

The table is elevated or lowered by means of a pair of jacks 13. Each of these jacks is provided with a rotary nut formed in the manner of a bevel gear, as indicated at 14 in Figures 1 and 3. These bevel gears mesh with bevel gears 15, such latter bevel gears being rigidly carried by the elevating shaft 16. This elevating shaft is provided with a squared portion 17 adapted to receive a crank or other implement to permit the manual elevating or lowering of the table. (See Figure 3.)

The bottles are fed on to the table 8 by means of the supply conveyor indicated generally at 18 in Figure 2. At this point the bottles are engaged by the transfer conveyor indicated generally at 19 in Figure 2, and are fed into position of the main conveyor indicated generally at 20 in Figure 2.

This main conveyor, indicated generally at 20 in Figure 2, is composed of a plurality of rods 21 which, as more clearly shown in Figures 10 and 11, are slidably related to the rods or bars 22. Both the rods 21 and the bars 22 are slidably encased within a guide 23 which, as may be seen from Figure 2, stops short of the ends of the rods of the main conveyor, preferably having a side extension 24, as shown in Figure 2, which projects along the side of the extended portions of the bars of the main conveyor.

The bars of the main conveyor are related, as shown in Figures 10 and 11. From these figures, it will be seen that the bar 21 is slidable upon the bar 22. It is provided with a pin 25 which works within a short slot 26 formed in the bar 22 and thus permits a slight relative motion between the bars. The bar 22 pivotally carries a plurality of feet or short levers 27, as may be seen from Figures 10, 11 and 12, and these levers are each provided with a pin 28 adjacent their hub portion which cooperates or works within a slot 29 formed in the bar 21. Thus when the bar 21 is moved rearwardly, that is, to the left, as shown in Figures 10 and 11, it strikes the pin 28 and rocks the feet 27 inwardly into the slot 30 formed in the bar 21 and out of the way of the bottles. Further motion of the bar 21 rearwardly causes the pins 25 to engage the ends of the slots in the bar 22 and thus bodily moves the bar 22 and all of the feet rearwardly. However, upon initiation of the forward motion of the bar 21, the feet are again thrown outwardly into the position shown in Figure 10 and, thereafter, the bar 22 is drawn forwardly by the bar 21 by engagement of the pins 25 in the end of the slots 26. Thus on the forward stroke of the main conveyor feeder bars, the feet are thrown outwardly into bottle engaging position, and on the rearward stroke are moved inwardly into housed position out of engagement with the bottles.

The bars 21 of the main conveyor are operated by means of levers 31, shown in Figures 1 to 4 inclusive, which are mounted on a rock shaft 32, as most clearly shown in Figures 1, 3 and 4. The rock shaft 32 is oscillated by mechanism described hereinafter.

Consider Figure 4 which shows the main elements of the driving mechanism of the machine. From this figure, it will be seen that an electric motor 33 is provided with a slotted drive shaft 34 upon which a pair of gears 35 and 36 are slidably splined, and are adapted to be shifted by any suitable mechanism, such mechanism being omitted for the sake of clearness. These gears are adapted to mesh respectively with the larger gears 37 and 38, loosely mounted upon a worm shaft 39. The gears 37 and 38 are adapted to be coupled to the shaft 39 by means of the clutch 40, the operating levers for the clutch being omitted as they are of conventional form and would merely obscure the disclosure.

The worm shaft 39, (see Figures 3 and 4) carries a worm which meshes with the worm wheel 41. The worm wheel in turn is rigidly carried by a short transverse shaft 42, which is provided with a pinion 43 meshing with a larger gear 44, such gear being a combination gear and cam as will shortly appear.

The gear 44 is rigidly secured upon the main stationary drive shaft 45, such drive shaft also carrying a capper operating cam 46 adjacent the end opposite the gear 44. The shaft 45 projects outwardly through the side frame members 2 of the machine, as shown in Figure 1, and carries a bevel gear 46' which meshes with a bevel pinion 47 slidably splined upon the vertical shaft 48. This vertical shaft 48 is slidable in the lower bearing 49 carried by the side frame members and is rigidly connected to a beveled pinion 50, the upper end of the shaft being carried by a bearing 51 projecting through the side frame bars, as most clearly shown in Figure 1, and movable up and down with the table.

The bevel gear 50 meshes with the bevel gear 52 which is rigidly mounted upon a movable drive shaft 53 which moves up and down with the adjustment of the table.

The movable drive shaft 53, as may be seen from Figures 1 and 4, carries a cam 54 which is grooved and receives a roller carried by a lever 55. This lever constitutes a bell crank lever, and its other arm 56, as shown most clearly in dotted lines in Figure 1, is connected by means of a pitman 57 with a lever carried by the rock shaft 30 previously described. The forward end of the pitman or link 57 is pivoted upon the pin 58 (see Figures 1 and 9) which is carried by a shoe 59 slidably mounted in guides formed on the lever 60, such lever being rigidly secured to the rock shaft 32. This shoe or adjustable block 59 is controlled as to its position with reference to the lever 60 by means of a threaded screw 61 (see Figure 9) carried by an upturned portion of the block and passing through a flange 62 integral with the lever 60. It is held in position by means of lock nuts 63. Further, it is preferable to provide graduations, as indicated at 64 in Figure 9, to indicate the adjustment or position of the block.

The block or shoe 59 slides at an angle to the axis of the lever 60 and this angle is so proportioned that irrespective of the adjustment of the block, the ultimate rear position of the lever 60 and consequently of the levers 31 will be unchanged, while their extreme forward limit of movement will be materially changed as the adjustment of the block is changed. For instance, as shown in Figure 9, the center line of the levers 31 has been indicated. The line 65 shows the rearmost position occupied by the center lines of the levers 31, and the lines 66 show the different positions occupied by the center lines of the levers 31 due to different positions of adjustment of the block 59.

Further, the position of the pivot 67, (see Figures 1, 10 and 11) which joins the levers 31 with the rods or bars 21, is indicated. For example the dot or center point 68 of Figure 9 illustrates the position of this pivot point at the extreme rearward position for all adjustments of the block 59 and the center points 69, on the line 66, indicate the successive positions occupied by this pivot point for different adjustments of the block 59. In other words, the bars 21 under all positions of adjustment of the block 59, travel rearwardly to the same position. While on their forward travel, they can be made to occupy any desired position, as indicated by the center points 69 in Figure 9. This causes the shoes 27 to move rearwardly to their extreme positions under all adjustments, and thus to properly engage the bottles as they are delivered from the transfer conveyor hereinafter described, and yet correctly positions the bottles under the filling and capping mechanism at their extreme forward positions of travel. The adjustment is provided to accommodate bottles of different diameters and consequently of different sizes so that the center of the bottles under the filling and capping means is assured by this adjustment and thus the machine is adapted to handle different types of bottles with an adjustment required only for the main conveyor, as will appear hereinafter.

Returning to the driving mechanism illustrated in Figure 4, it will be seen that the main drive shaft is connected by means of sprocket wheels and a chain 70 to a shaft 71. This shaft 71 is indicated in dotted lines in Figure 1, and is connected by means of bevel gears with a telescopic shaft 72. This telescopic shaft carries a bevel gear 73 at its upper end which meshes with a bevel gear 74 carried by a transverse shaft 75, such shaft 75 being journalled or carried by the movable table, being in reality carried by the rear plates 10. (See Figure 1.) Thus when the table is moved up and down to accommodate different heights of bottles, the shaft 72 lengthens or shortens and maintains an operative drive between the shafts 71 and 75.

The shaft 75 carries a mutilated gear 76 which, as may be seen from Figure 8, meshes with a pinion 77 carried by the shaft 78. The upper end of the shaft 78 is connected by means of bevel gears with the shaft 79. This shaft 79 appears in Figures 7 and 8, and is connected by means of bevel gears with a transverse shaft 80 which in turn is connected by means of bevel gears with a sprocket wheel shaft 81.

This sprocket wheel shaft carries the sprocket wheels 82 which drive the chains 83. These chains 83 are provided with a plurality of slats 84 and thus form the supply conveyor 18. (See Figure 2.) This supply conveyor is provided with arms 85 (see Figure 3) which are pivotally connected to the table top, as shown, and also it is to be noted that a supporting roller 86 is provided at this point of pivotal union for the support of the feed conveyor 18. The outer ends of the arms 85 are connected by means of slot and pin joints with a supply counter 87 upon which the bottles to be filled are initially placed.

It is to be noted that adjacent the outer ends of the arms 85 a transverse shaft 88 is provided and carries sprocket wheels 89 which in turn carry the outer ends of the chains 82, as most clearly shown in Figure 7.

The shaft 88 is provided with bevel gears at its ends which mesh with similar bevel gears carried by the vertical shafts 90, as shown in Figure 7. These vertical shafts 90, carry star wheels 91 which feed the two rows of bottles from the counter 87 on to the supply conveyor 18. Further, it will be noted that although the main table is adjusted up and down to accommodate bottles of different heights, that nevertheless no interference occurs with the supply conveyor 18 or with the arms 85 due to the construction described and illustrated in Figures 3 and 7.

The supply conveyor, it will be seen is given a step by step movement by means of the mutilated bevel gear 76 and the bevel pinion 77. (See Figures 7 and 8.) Thus the bottles are advanced in two rows, in the form illustrated, into position upon the bottle filling machine.

It is to be noted that an entire double row of bottles is positioned at one travel of the supply conveyor 18 upon the bottle filling machine. In addition to this, the conveyor 18 is locked against accidental motion at the completion of this movement. This locking is secured by the mechanism illustrated in detail in Figure 8 and shown on the left hand side of the main machine, as shown in Figure 3.

Referring to Figure 8, it will be seen that the bevel gear 76 is provided with a depressed portion 92 and otherwise is provided with its usual raised periphery. A lock 93 is adapted to ride upon the periphery of the gear 76 and is provided with a finger 94 which is held out of engagement with the beveled pinion 77 while the pinion engages the gear teeth. However, when the blank portion of the gear is presented to the pinion 77, the lock 93 slides downwardly and the tongue or lug 94 enters the space between the teeth in the pinion 77 and thus locks the conveyor 18.

After the two rows of bottles have been positioned upon the machine by means of the feed conveyor 18, the transfer conveyor, indicated generally at 19 in Figures 1 and 2, operates to transfer the bottles from the zone of action of the conveyor 18 to that of the main conveyor 20. This transfer conveyor comprises a pair of side rods 95 (see Figures 1 and 2) which carry four rods 96, 97, 98, and 99.

The rods 99 and 98 project outwardly beyond the side bars 95 and are carried by the longitudinally slidable frame 100. (See Figures 1 and 2.) This longitudinally slidable frame 100 is provided at its bottom portion with an extended foot which carries the pins 101 upon which rollers are mounted, such rollers operating in a vertically movable channel bar or frame 102. Thus, the frame 100 is adapted to slide back and forth horizontally, being guided by the frame 102. In turn, the frame 102 is guided for vertical motion, by means of the feet 103 which slide in slots 104 formed in the rear plates 10, it being noted that this mechanism is duplicated on opposite sides of the machine.

Further, it is to be noted from reference to Figure 1 that the frame 100 is provided with a vertical slot 105 within which the pin, or a roller carried by the pin 106 operates. This pin is moved back and forth by means of the link 107 connecting the lever 108 with the frame 100. This pin also travels in a horizontal slot 109 formed in the rear plates 10 (see Figure 1,) so that it is guided in its horizontal motion,—the extreme limit of motion of the pin 106 being indicated by the heavy dot or center point 106ª, shown in Figure 1.

It is to be understood that the mechanism just described is duplicated on opposite sides of the machine, that is to say, two levers 108 are secured to the rock shaft 110. This construction is shown with greatest clearness in Figures 1 and 4.

The rock shaft 110 carries a lever 111 which is connected by means of a link 112 with the arm 56 of the bell crank lever driven from the cam 54. Thus, horizontal motion of the transfer conveyor 19 is controlled by the cam 54.

Vertical motion of the transfer conveyor 19 is secured by means of the cams 113, shown in dotted lines in Figure 1, and in full lines in Figure 4. These cams are positioned at opposite ends of the shaft 75 and drive the cam followers or levers 114 which are connected by means of short shafts 115 with the rock arms 116. The rock arms 116 are positioned on opposite sides of the machine and engage the horizontal channel irons 102. Preferably such rock arms are provided with rollers 117 which ride on the under side of the horizontal channel members 102. The extreme position of the center of the rollers 117 at its lowest point is indicated by the black center point 117ª in Figure 1.

The motion derived from the mechanism just described and from the cams 54 and 113 causes the transfer conveyor to move in the outline of a rectangle enclosing two rows of bottles. As shown in Figure 1, consider one of the bars or rods, for instance the bar 96. This bar moves rearwardly, as shown by the dotted line until it assumes the position indicated at 96ᵇ—the cam 54, through the link mechanism described, furnishing this motion, and also it being noted that the frame 100 is traveling horizontally in the frame 102. Thereafter, this motion ceases and the bar 96 travels downwardly to the position indicated at 96ᶜ in Figure 1. This downward motion is given by means of the cams 113, such cams, through the mechanism described, moving the frame members 102 downwardly.

The pin 106, during this motion, travels in the slot 105. Thereafter, the cam 54, through the link mechanism described, causes the frames 100 to move forwardly, the bar 96 moving to the position indicated at 96ᵈ. Thereafter, this motion ceases and the bar 96 moves upwardly into its initial position through the medium of the cams 113, the intermediate mechanism and the frames 102.

It will be seen, therefore, that this transfer conveyor bodily moves over the tops of the bottles to its rearmost position and drops downwardly into position to engage four rows of bottles by means of the rods 96, 97, 98 and 99. Thereafter, this transfer conveyor 19 moves forwardly and thus advances (a distance corresponding to two rows) four rows of bottles. This positions the bottles into place for proper engagement by the main conveyor 20, as previously described.

The sequence of operation of the conveyors 18, 19, and 20 is as follows:—The supply conveyor 18 moves two rows of bottles on to the machine. The transfer conveyor 19 moves rearwardly then downwardly and then forwardly, advancing the two new rows of bottles and the two rows previously advanced. This advance is as stated, a space equal to two complete rows. The transfer conveyor 19 then rises and the main conveyor 20 engages the positioned bottles and moves them into place beneath the filling and capping machines. While the main conveyor is making its rearward stroke, the transfer conveyor is similarly making a rearward stroke and prior to its arrival at its rearmost position the supply conveyor has positioned two new rows of bottles in place upon the machine. Thus, the several conveyors operate in timed relation to each other and prevent any possibility of congestion of the bottles occurring in the machine, the bottles being advanced in an orderly and step by step manner.

As shown in Figures 1 and 2, the bottles are pushed outwardly upon the forward end of the table or, if desired, upon any suitable device provided for their reception.

The table 8 is provided with four rows of spring held bases 118 and with two rows of similarly spring held bases 119. The four rows of bases 118 are positioned beneath the four filling tubes 120 (see Figure 1) and the two rows of bases 119 are positioned beneath the two rows of capping devices indicated generally at 121 in Figure 1. These spring pressed bases are illustrated in greater detail in Figure 16. They are of similar construction. For instance, the base 118, as shown in Figure 16, is positioned within a recess formed in the table 8 and is spaced from the inner edge of such recess. It is provided with a downwardly extending sleeve 122 which fits within a cup 123 and is yieldingly urged upwardly by means of the spring 124. A bolt or rod 125 is screwed at its upper end into the base 118 and limits the upward motion. A pair of nuts 126 are screwed upon the lower end of the rod 125 to adjustably determine the height of rise of the base 118. This adjustment is so made that the base accurately aligns with the table top, as shown in Figure 16.

It is to be noted that openings 127 are provided, as shown in Figure 16, so that in case a misshapen bottle is broken the milk will not flood the table but will run directly downwardly therethrough. Further, it is to be noted that the unit associated with a spring pressed base 118 may be bodily removed from the machine for adjustment or repair.

The bottle filling tubes indicated generally by the reference character 120 in Figure 1 are shown in greater detail in Figure 16. They comprise tubes 128 which are threaded into apertures formed in the base of a milk vat 5, as previously described, such vat being carried by extensions 3 of the side frame members of the machine. It is to be noted that this vat is divided by means of a partition 129 into two compartments for a purpose hereinafter to appear. The tubes 128 are provided with flanges 130 which accurately fit recesses formed in the base of the vat 5, as shown in Figure 16. These tubes are stationary. Slidable tubes or sleeves 131 are positioned upon the stationary tubes, as shown in Figure 16. These slidable tubes are provided with notches or grooves 132 which fit projecting lugs 133 of attaching members 134, such attaching members being carried by transverse bars 135. The transverse bars 135 are in turn carried by cross heads 136 operated by mechanism described hereinafter, and execute up and down strokes. Each of the fasteners 134 is removably held in place by the spring pressed locking ball 137 (see Figure 16) so as to permit individual removal of the valve parts without dismantling the entire machine.

The bottom portion of the slidable tubes or sleeves 131, which in reality constitute filling tubes are provided with an internal valve seat 138 against which a valve 139 is adapted to seat when the device is closed. This valve 139 is carried at the lower end of the vent tubes 140 which are guided, as shown within the stationary tubes 128. Further, an extension tube 141 of the air vent tube is provided with flaring lower ends to direct the milk outwardly against the sides of the bottle, thus maintaining a free outward passage for the air. An outer slidable sleeve 142 is mounted upon the downwardly extending reduced portion 143 of the slidable tubes 131. These sleeves seat against the flaring lower ends of the extensions 141 when in their lowermost positions and thus constitute valve seats 144. They are provided with rubber rings 145 contoured to fit the neck of the bottles 146, as indicated in Figure 16. Further, the slidable members 142 mounted upon the filling tubes are provided with lugs 147, preferably round in section, which extend through apertures in the slidable tubes 131 and dislodge the valves 139 when a bottle is engaged by the filling mechanism, as shown on the right hand side in Figure 16. However, binding cannot occur in this device because of the yielding bases 118 and although a slight difference in length of bottle may be encountered, nevertheless, excessive pressure will not be produced.

It is to be noted that when the filling tubes 131 ascend, the sleeves 142 move downwardly and cause contacting of the valve faces 144. Thereafter, the valve 139 seats. Upon lowering of the filling tubes 131, the reverse sequence of operations takes place.

The mechanism for moving the cross heads 136 up and down comprises vertical slides 148 (see Figure 1) which are engaged at their lower ends by means of levers 149. These levers 149 are secured to opposite ends of the rock shaft 150. This rock shaft is more clearly shown in Figures 4 and 5, and it will be seen that such rock shaft is provided with a lever 151 which carries a roller fitting within a groove formed in the combined gear and cam 44 carried by the main stationary drive shaft 45. This mechanism is, of course, duplicated on opposite sides of the machine and thus a uniform and smooth operation of the mechanism is assured.

Referring again to Figures 1 and 4, it will be seen that the main drive shaft carries the cam 46 which operates the lever 152 rigidly secured to the rock shaft 153. This rock shaft 153 carries arms 154 at opposite ends thereof on the outer side of the machine, as shown in Figures 1 and 4. These levers or arms 154 engage the vertical slides 155 similarly to the slides 148, previously described. They are secured at their upper ends to the cross head 156 which carries two sets of capping mechanisms.

The capping mechanisms are illustrated in Figures 13 and 13ª, and it will be seen that each cross head carries a plurality of downwardly extending rods or plungers 156' whose lower ends are enlarged to provide capping heads 157. These capping heads normally rest against the lower side of bosses 158 formed integrally with the capping chambers 159. These capping chambers are all joined by means of the transverse plate or member 160. This member 160 is provided with flared annular members 161 which engages the tops of the bottles, as shown in Figures 13 and 13ª. Adjacent the capping chambers 159 reservoirs or tubes 162 for the caps 163 are provided. The tubes 162 are releasably gripped at their lower ends so that they may be adjusted to caps of different thicknesses. Communication is afforded between the reservoirs and the capping chambers by means of a small slot 164. A reciprocating knife 165, as shown most clearly in Figure 14, is provided for each of the reservoirs and capping chambers. This knife is also indicated in section in Figure 15. It is rigidly secured to the transverse members 166 which in turn are rigidly secured to the transverse slides 167. These transverse slides operate in a groove formed in a depressed portion of the member 160, as shown in Figure 15.

The outer ends of the slides 167 are provided with rollers 168 which engage oppositely directed faces of the cams 169, such cams being carried by a stationary portion of the mechanism such as the side frame members, as indicated in Figure 3.

In operation, the cross head 156 is raised and lowered, thus raising and lowering the capping mechanism. However, when the capping mechanism encounters a bottle, as shown in Figure 13, its body portion is arrested and the capping plungers project caps downwardly from the capping chambers into the mouths of the bottles. It is to be noted that each time the capping plungers rise they move upwardly into engagement with the bosses 158 and thereafter new caps are fed into the chambers 159 by the action of the cam members 169. Thus the capping mechanism is wholly automatic in its operation.

It will be seen that a novel form of bottle filling machine has been provided in which a supply conveyor brings bottles in a regular order to the machine, in which a transfer conveyor transfers the bottles from the supply conveyor to a suitable position for subsequent action of the main conveyor.

It will be seen further that the machine is so constructed that a rapid and positive operation of the parts is assured while the individual bottles are not required to suddenly start and stop with excessive jerks, but are fed a plurality at a time through the machine to thus secure a large output with a relatively small speed for the individual bottle.

It will be seen further that novel means have been provided for adapting a machine to the handling of bottles of different sizes so that the machine will correctly center the bottles beneath the filling and capping mechanisms.

It is to be noted particularly from reference to Figure 1, that the filling of large bottles, such for instance as quart bottles may be made in two stages due to the four rows of filling tubes, indicated generally at 120. For instance, the quart bottle may be filled from first one-half of the vat 5, and thereafter, from the second half of such vat without requiring any slowing up in the action of the machine. With other and smaller sized bottles, it may be necessary to use only one-half of the vat at a time.

It will be seen further that a machine has been provided which will successfully handle a large number of bottles in a given interval of time, which is wholly automatic in its action and which is of reliable and substantial construction.

Further, it will be seen that a novel form of bottle filling machine has been provided which although of large capacity occupies small floor space.

Although the invention has been described in considerable detail, such description is intended as illustrative rather than limiting as the invention may be variously embodied and as the scope of such invention is to be determined as claimed.

I claim:

1. A bottle handling machine comprising a table, means for raising and lowering said table to accommodate different sizes of bottles, a main conveyor adapted to engage a plurality of bottles arranged in a plurality of longitudinal rows and to simultaneously advance said bottles longitudinally of said table, a supply conveyor adapted to deliver bottles in rows to said table, and a transfer conveyor adapted to engage an entirely transverse row of bottles and simultaneously move such row into reach of said main conveyor, whereby a simultaneous feed of a plurality of longitudinal rows of bottles along said table, is secured.

2. A bottle handling machine comprising an elongated table adapted to be raised and lowered, a main conveyor adapted to advance simultaneously a plurality of longitudinal rows of bottles along said table with periods of dwell, a supply conveyor adapted to deliver bottles to said table, a transfer conveyor adapted to engage a transverse row of bottles and move them into the range of said main conveyor, driving mechanism carried by a stationary portion of said machine, and driving mechanism carried by said table for operating all of said conveyors, said last mentioned driving means being operatively connected with the first mentioned driving means and permitting vertical adjustment between such means.

3. A bottle handling machine comprising a bed plate having a pair of upright side members rigidly secured thereto, a table vertically adjustable and positioned between said side members, driving mechanism mounted upon said bed plate, driving mechanism carried by said table and movable therewith, means connecting said driving means irrespective of the adjustment of said table, a main conveyor carried by said table and having a plurality of parallel rods extending longitudinally of said table, means operated by said second mentioned driving means for reciprocating said rods, members carried by said rods for engaging said bottles when said rods move in one direction to advance said bottles, said table having a supply portion, and a transfer conveyor carried by said table and adjustable therewith and operated by said second mentioned driving means, said transfer conveyor having a member adapted to engage a row of bottles at the receiving end of said table and to move them into position for engagement by the members of said main conveyor.

4. A bottle filling machine comprising a table across which bottles are adapted to be passed, a main conveyor for passing said bottles across said table, a supply conveyor for delivering bottles to said table, a transfer conveyor for moving said bottles from said supply conveyor to said main conveyor, said transfer conveyor having a rod extending transversely of said table, and mechanism for moving said rod over the tops of said bottles and rearwardly downwardly behind said bottles and forwardly to thereby move said bottles into the zone of action of said main conveyor.

5. A bottle filling machine comprising a table, a main conveyor for advancing said bottles longitudinally of said table, means for placing said bottles adjacent the rear end of said table, a transfer conveyor having a rod extending transversely of said table, said transfer conveyor having mechanism for moving said rod in a closed path rearwardly, downwardly, forwardly and upwardly, whereby said rod first passes over a row of bottles adjacent the rear of said table, and, thereafter descends and moves said bottles into the zone of action of said main conveyor and subsequently rises out of the way of the advanced row of bottles.

6. A bottle filling machine comprising a table, a main conveyor for advancing bottles along said table, said table having a rear end upon which rows of bottles are adapted to be placed, and a transfer conveyor for moving a row of bottles from the rear end of said table into the zone of action of said main conveyor, said transfer conveyor comprising side frame members joined by a transverse member, means for reciprocating said side frame members, and means for elevating and lowering said side frame members.

7. A bottle filling machine comprising a table, a main conveyor for advancing bottles along said table, said table having a rear end upon which rows of bottles are adapted to be placed, and a transfer conveyor for moving a row of bottles from the rear end of said table into the zone of action of said main conveyor, said transfer conveyor comprising side frame members joined by a transverse member, means for reciprocating said side frame members, and means for elevating and lowering said side frame members, said reciprocating means and said raising and lowering means executing alternate strokes, whereby said transfer conveyor moves in a closed path.

8. In a bottle filling machine, the combination of means for moving said bottles from adjacent the rear end of said machine to the forward end, and a transfer conveyor for moving rows of bottles from the rear end of the machine into the zone of action of said first mentioned means, said transfer conveyor comprising horizontal guide members, mechanism for raising and lowering said horizontal guide members, a vertical member carried by and slidable upon said horizontal guide members, and mechanism for reciprocating said vertical member forwardly and rearwardly.

9. In a bottle filling machine, the combination of means for moving said bottles from adjacent the rear end of said machine to the forward end, and a transfer conveyor for moving rows of bottles from the rear end of the machine into the zone of action of said first mentioned means, said transfer conveyor comprising horizontal guide members, mechanism for raising and lowering said horizontal guide members, a vertical member carried by and slidable upon said horizontal guide members, and mechanism for reciprocating said vertical member forwardly and rearwardly, said mechanisms operating in a timed sequence, and alternately imparting motions to said transfer conveyor.

10. In a bottle filling machine, the combination of a table, a main conveyor adapted to move bottles along said table, a supply conveyor adapted to move a row of bottles transversely across the rear end of said table, a transfer conveyor adapted to move such row of bottles into the zone of action of such main conveyor, and means for locking said supply conveyor after each delivery of a row of bottles.

In testimony that I claim the foregoing I have hereunto set my hand at Milwaukee, in the county of Milwaukee and State of Wisconsin.

GEORGE A. FULLIPS.